United States Patent [19]

Pohlenz

[11] 4,254,849

[45] Mar. 10, 1981

[54] DAMPING ARRANGEMENT

[75] Inventor: Hans Pohlenz, Koblenz, Fed. Rep. of Germany

[73] Assignee: Stabilus GmbH, Koblenz-Neuendorf, Fed. Rep. of Germany

[21] Appl. No.: 970,969

[22] Filed: Dec. 19, 1978

[30] Foreign Application Priority Data

Dec. 24, 1977 [DE] Fed. Rep. of Germany ....... 2758083

[51] Int. Cl.³ .............................................. F16F 9/34
[52] U.S. Cl. ...................................... 188/275; 137/38
[58] Field of Search ................. 188/275, 288; 137/38; 248/559, 565; 267/8 D

[56] References Cited

U.S. PATENT DOCUMENTS

| 1,818,141 | 8/1931  | Lang ........................ 188/275 |
| 2,060,532 | 11/1936 | Rossman ................... 188/275 |
| 2,083,272 | 6/1937  | McCann ................... 188/275 X |
| 2,329,803 | 9/1943  | Whisler, Jr. .............. 188/275 |
| 3,319,741 | 5/1967  | Hauck ...................... 188/275 |
| 3,447,644 | 6/1969  | Duckett .................... 188/288 |
| 3,963,227 | 6/1976  | Molders . |
| 4,126,302 | 11/1978 | Curnutt ..................... 267/8 D |

FOREIGN PATENT DOCUMENTS

| 584952  | 1/1947  | United Kingdom . |
| 947834  | 1/1964  | United Kingdom . |
| 1072463 | 6/1967  | United Kingdom . |
| 1095657 | 12/1967 | United Kingdom . |
| 1192846 | 5/1970  | United Kingdom . |

Primary Examiner—George E. A. Halvosa
Attorney, Agent, or Firm—Brumbaugh, Graves, Donohue & Raymond

[57] ABSTRACT

A damping arrangement for the tub assembly of a washing machine and the like in which a piston mounted on a piston rod in the cavity of a cylinder axially separates two compartments of the cavity and is formed with restricted throttling passages connecting the compartments. The piston may be by-passed by a bore in the piston rod having respective orifices in the two compartments, one orifice being capable of being blocked by an inert mass mounted on the piston rod in one of the compartments for oscillation at the end of a spring. Movement of the inert mass away from a rest position toward which it is normally biased by the spring is limited by a secondary hydraulic damper to prevent operating noise and reduce premature wear.

10 Claims, 2 Drawing Figures

DAMPING ARRANGEMENT

This invention relates to the damping of vibrations in rotating machinery, and particularly to a damping arrangement the damping force of which varies in response to the frequency of vibration.

The invention will be described in its application to domestic laundry machinery, but is not limited to a specific field. Tubs of domestic laundry machines are rotated during machine operation and tend to vibrate because of the unevenly distributed load. It is common practice to interpose damping elements between the tub assembly and the machine frame to hold the vibration amplitudes within acceptable limits. The damping effect required at certain critical rotary speeds is very high whereas equal damping at other speeds would unnecessarily absorb driving energy.

Known damping arrangements employ telescopic shock absorbers of a basically conventional type in which a cylinder is at least partly filled with liquid, and a piston axially guided in the cylinder separates two compartments of the cylinder cavity and is attached to a piston rod sealed to the cylinder for axial movement into and out of the cavity. One or more throttling passages in the piston connect the compartments, but may be by-passed by a bore in the cylinder rod which has orifices in the two compartments. An inert mass is axially guided on the piston rod and biased toward a certain axial position by a spring. One of the orifices leading into the axial bore of the piston rod is at least approximately blocked and unblocked in response to the axial movement of the inert mass. It has been found that the mass, when oscillating at its maximum amplitude, may knock against other elements of the shock absorber, thereby causing noisy operation and reducing the useful life of the apparatus.

It is a primary object of this invention to provide a frequency responsive damping arrangement which avoids the aforedescribed shortcomings of known arrangements by damping the velocity of the oscillating inert mass, particularly at maximum amplitude.

The damping arrangement of the invention is thus equipped with a hydraulic secondary damping device which damps axial movement of the inert mass away from the position intermediate its terminal positions toward which it is biased by the associated spring.

Other features, additional objects, and many of the attendant advantages of this invention will readily be appreciated as the same becomes better understood by reference to the following detailed description of preferred embodiments when considered in connection with the appended drawing in which.

Figure 1:
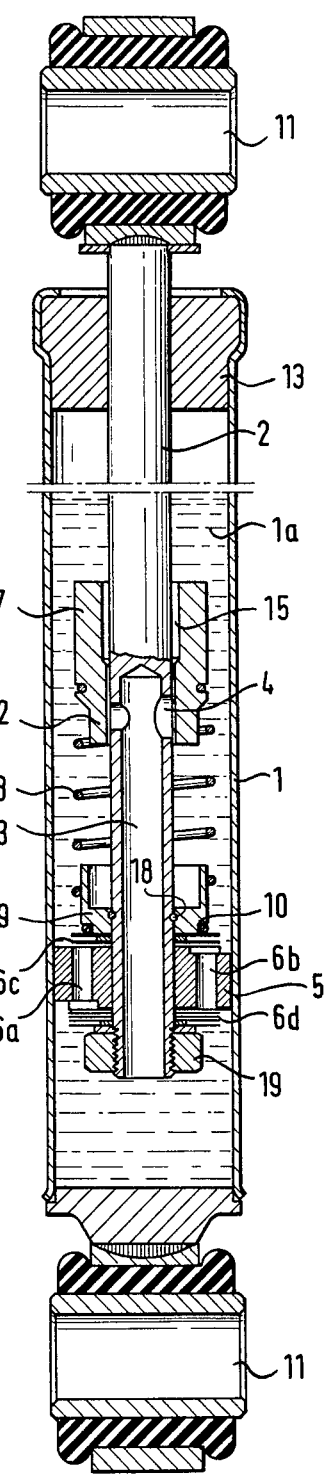
FIG. 1 shows a damping arrangement of the invention in elevational section.

Referring initially to FIG. 1, there is seen a cylinder 1 whose cavity is partly filled with hydraulic brake fluid 1a. A coaxial piston rod 2 sealingly moves into and out of the cylinder cavity through an annular end wall 13 of the cylinder, not shown in detail. The other end wall of the cylinder 1 and the axial end of the piston rod 2 outside the cylinder cavity carry respective fastening eyes 11 by means of which the illustrated damping arrangement may be mounted between the tub assembly and frame of a washing machine in a conventional manner, not shown.

A piston 5 is axially secured on the inner end of the piston rod 2 between a clamping nut 19 and a cup-shaped receptacle 9 which itself is held in position on the piston rod 2 by a spring clip 18. The piston 5 axially separates two compartments of the cylinder cavity which may be connected by two sets 6a, 6b of axial throttling bores in the piston 5. The bores 6a, of which only one is seen in the drawing, are normally closed toward the end wall 13 by an annular spring plate 6c clamped between the receptacle 9 and the piston 5 and permanently open in the opposite direction. The corresponding bores 6b are permanently open toward the end wall 13 and normally closed in the opposite direction by a spring plate 6d clamped between the piston 5 and the nut 19.

An axial bore 3 in the piston rod 2 has an orifice permanently open toward the cylinder compartment, which appears below the piston 5 in the view of FIG. 1, and two radial orifices 4 directed toward the cylinder compartment above the piston 5, but almost entirely blocked in the illustrated condition by the reduced lower end 12 of a heavy-walled control sleeve 7 freely slidable on the piston rod 2. The sleeve 7 is normally biased toward the illustrated position by a helical wire spring 8 one end of which is secured in a circumferential groove of the sleeve portion 12, whereas its other end is received in a circumferential groove 10 of the receptacle 9.

When the sleeve 7 moves axially upward from the illustrated position, its lower end 12 clears the orifices 4, and liquid can pass freely between the two cylinder compartments through the bore 3 whose flow section is greater than that available from bores 6a, 6b. If the sleeve 7 shifts downward, the orifices 4 communicate with an enlarged, annular gap 15 between the main body of the sleeve 7 and the piston rod 2 until the sleeve 7 again fully clears the orifices 4. The spring plates 6c, 6d operate in the conventional manner as one-way valves to open the bores 6a when the piston rod 2 moves inward of the cylinder 1, and to open the bores 6b during outward piston rod movement. The leakage path available between the sleeve end 12 and the piston rod 2 in the illustrated sleeve position has a flow section much smaller than that of either set of bores 6a, 6b.

The cup-shaped receptacle 9 is axially open toward the sleeve 7 and dimensioned to receive therein the reduced lower end 12 of the sleeve with a clearance gap sufficient to permit sharply throttled escape of the liquid otherwise trapped in the receptacle 9 during inward movement of the sleeve end 12.

The inert mass of the sleeve 7 and the resilient force of the spring 8 are selected in such a manner that the natural frequency of the oscillating system constituted thereby is different from the frequency of the particularly heavy vibrations induced in the tub assembly of the washing machine when the tub is turned during washing at a certain critical range of rotary speeds. Under these conditions, the sleeve 7 does not move significantly from the illustrated position, and the maximum damping effect of the apparatus is achieved as the liquid 1a must pass through the narrow bores 6a, 6b.

When the tub is accelerated from washing speed to spinning or centrifuging speed, it exceeds the critical range of speeds, and the resulting vibratory frequency is close enough to the natural frequency of the sleeve 7 and spring 8 to cause oscillation of the sleeve about the position shown in FIG. 1. When the oscillations reach sufficient amplitude, the lower sleeve end 12 dips into the receptacle 9, and its kinetic energy is partly converted into heat in the liquid 1a as the liquid is squeezed out of the receptacle through the narrow gap between concentric cylindrical faces of the receptacle 9 and the sleeve end 12.

Depending on the manner in which the damping arrangement is mounted between the washing machine frame and the tub assembly, the sleeve 7 may not come within range of the end wall 13, and no secondary damping device may be needed to brake the approach of the sleeve 7 to the end wall 13. If this is necessary, the otherwise practically unchanged apparatus of FIG. 1 may be modified in the manner illustrated in FIG. 2.

The annular end wall 13' on the cylinder 1 of the modified damping arrangement carries a stationary, coaxial, tubular plunger 14. The clearance gap 15' between the piston rod 2 and the main body of the sleeve 7', not otherwise different from the sleeve 7, is widened sufficiently to provide a receptacle in which the plunger 14 is received as the sleeve 7' approaches its terminal position adjacent the end wall 13', whereby the viscous resistance of the liquid 1a to displacement from the receptacle 15' by the plunger 14 brakes the sleeve 7' to a standstill before it can strike the end wall 13'.

Figure 2:
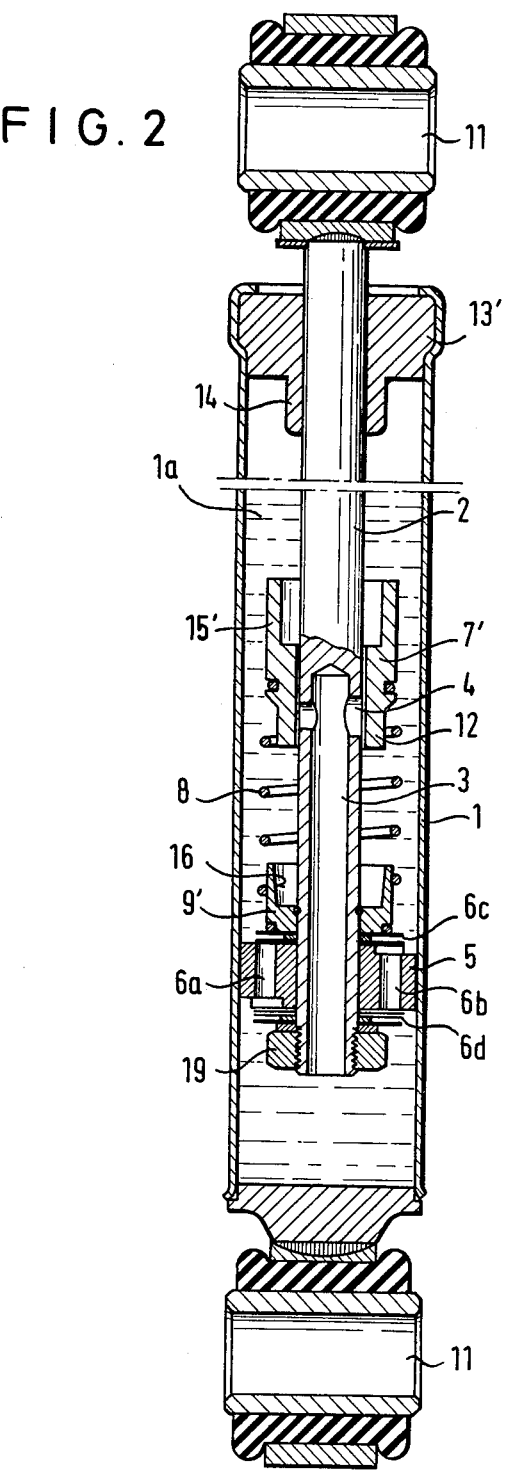
FIG. 2 illustrates a modification of the device of FIG. 1 in an analogous view.

The only other illustrated feature in which the embodiment of FIG. 2 differs from the device of FIG. 1 consists of an internal, axial face 16 of the receptacle 9' which tapers conically inward of the receptacle. As the sleeve end 12 enters the receptacle 9', the effective flow section of the throttling gap between the cylindrical outer face of the sleeve end and the conical inner face of the receptacle 9' decreases gradually for increasing the damping effect.

As not specifically illustrated, but obvious from the showing of FIG. 2, this effect may be further modified by giving a conical shape also to the sleeve end 12, and the receptacle 15 and plunger 14 may be modified in an analogous manner. Other variations and permutations will readily suggest themselves on the basis of the above teachings. The illustrated positions of the male and female damping elements on the inert mass of the sleeve 7 and on the piston or cylinder may be interchanged. In a device according to FIG. 2, two receptacles may be installed on the sleeve 7' for cooperation with plungers on the end wall 13', as actually shown, and on the piston 5 respectively without basically affecting the mode of operation.

It should be understood, therefore, that the foregoing disclosure relates only to currently preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A damping arrangement comprising:
   (a) a cylinder member having an axis and bounding a cavity therein;
   (b) a piston rod sealingly engaging said cylinder member for axial movement inward and outward of said cavity;
   (c) a liquid in said cavity;
   (d) a piston member mounted on said piston rod in said cavity and axially defining two compartments of said cavity,
   (1) said piston member being formed with at least one throttling passage for restricted flow of said liquid between said compartments,
   (2) said piston rod being formed with a bore having respective orifices in said compartments for bypassing said piston member,
   (e) an inert mass mounted on said piston rod for axial movement in one of said compartments between two axially terminal positions;
   (f) blocking means movable in said cavity toward and away from a blocking position in which said blocking means impedes flow of said liquid through one of said orifices, said blocking means constituting a portion of said inert mass and said blocking means being moved toward and away from said blocking position in response to said axial movement of said mass;
   (g) a spring interposed between said mass and said piston rod for biasing said mass toward a pre-determined axial position spacedly intermediate said terminal positions, ; and
   (h) hydraulic damping means for damping axial movement of said mass in a direction away from said intermediate position and toward both of said terminal positions to prevent contact with said piston and the end wall of said cylinder member in said compartment, said damping means comprising first damping elements on said inert mass and a second damping element on each of said piston and end wall in said one compartment, one of said first and second elements bounding a receptacle open axially toward the other element, the other element being dimensioned to be received in said receptacle during axial movement of said mass.

2. An arragement as set forth in claim 1, wherein the effective flow section of said at least one throttling passage is greater than the effective flow section of said bore when said blocking means is in said blocking position, and smaller than the effective flow section of said bore when said blocking means is away from said blocking position.

3. An arrangement as set forth in claim 1, wherein said hydraulic damping means damp movement of said mass only when said mass closely approaches a terminal position thereof.

4. An arrangement as set forth in claim 1, wherein said first damping elements constitute an integral portion of said mass.

5. An arrangement as set forth in claim 1, wherein said one element is mounted on said piston rod.

6. An arrangement as set forth in claim 1, wherein said one element is fixedly connected to said mass, said other element being mounted on said cylinder member.

7. An arrangement as set forth in claim 1, wherein said receptacle and the other element received therein bound an axially open throttling gap for escape of said liquid from said receptacle during movement of said other element inward of said receptacle.

8. An arrangement as set forth in claim 7, wherein the effective flow section of said gap decreases during said inward movement of said other element.

9. An arrangement as set forth in claim 1, wherein said spring has two axial ends respectively fastened to said mass and to said second damping element.

10. An arrangement as set forth in claim 1, wherein one of said second damping elements is axially secured on said piston rod and abuttingly engages said piston member.

* * * * *